Sept. 5, 1939.  O. W. SJOGREN ET AL  2,171,768

DISK BEDDER

Filed Nov. 17, 1937  2 Sheets-Sheet 1

Inventors
Oscar W. Sjogren
George E. Gerold
By Lyon & Lyon
Attorneys

Sept. 5, 1939.  O. W. SJOGREN ET AL  2,171,768
DISK BEDDER
Filed Nov. 17, 1937  2 Sheets-Sheet 2
Fig. 3.
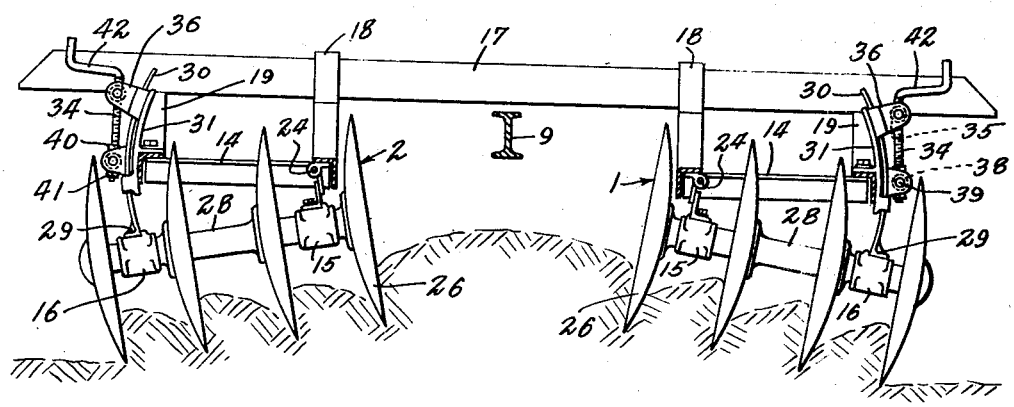
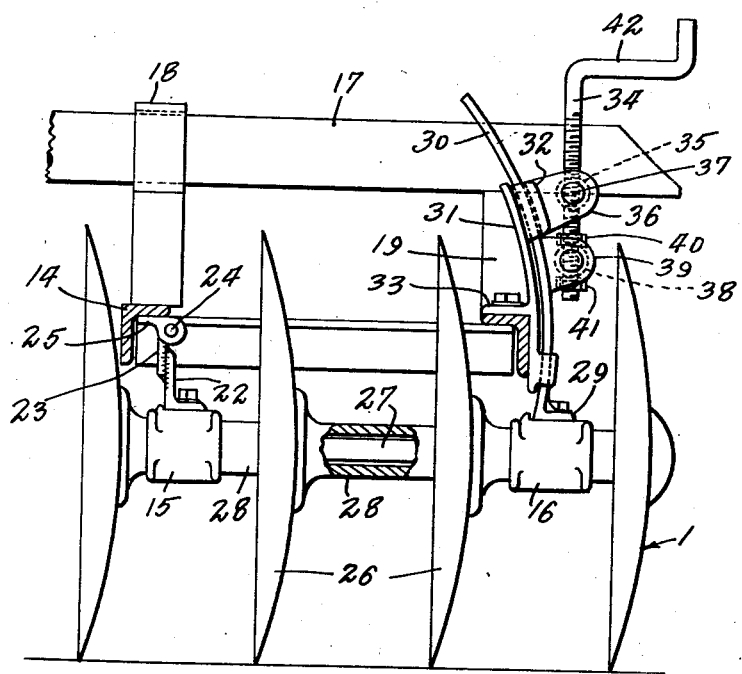
Fig. 4.
Inventors
Oscar W. Sjogren
George E. Gerold
By Lyon & Lyon
Attorneys Patented Sept. 5, 1939

2,171,768

UNITED STATES PATENT OFFICE 2,171,768

DISK BEDDER

Oscar W. Sjogren, Huntington Park, and George E. Gerold, Los Angeles, Calif., assignors to Killefer Manufacturing Corporation, Los Angeles, Calif., a corporation of California Application November 17, 1937, Serial No. 175,006

5 Claims. (Cl. 55—83)

This invention relates to disk bedders, and more particularly to disk bedders including a multiplicity of gangs of concavo-convex disks connected together in fore and aft relation and supported in such a manner as to permit the individual gangs to be angled in a vertical plane so as to form borders for the cultivation of cantaloupe, lettuce or the like.

It is an object of this invention to provide a disk bedder which is of rigid construction and is susceptible of easy manipulation to the desired ridging position without the necessity of elevating the implement in order to position the gangs of disks in the desired ridging position.

Another object of this invention is to provide a ridger which includes a plurality of gangs of disks which may be angled to suitable or desirable working position and which ridger includes a plurality of gangs of disks mounted in spaced relation and which gangs of disks include an elevating mechanism by which the individual gangs of disks may be angled in a vertical plane to the desired position for forming or breaking down a bed or ridge as desired, and which construction does not require releasing of the disk gangs or disk gang carrying frames from the structure in order to permit of the desired angulation in the vertical plane of the disk gangs.

Other objects and advantages of this invention it is believed will be apparent from the following detailed description of a preferred embodiment thereof as illustrated in the accompanying drawings.

In the drawings:

Figure 3 is a front elevation with the hitch removed of the disk ridger embodying our invention.

Figure 4 is an enlarged view of one disk gang illustrating the frame structure as in vertical section and showing particularly the tilting mechanism for the disk gangs embodied in our invention.

Figure 1:
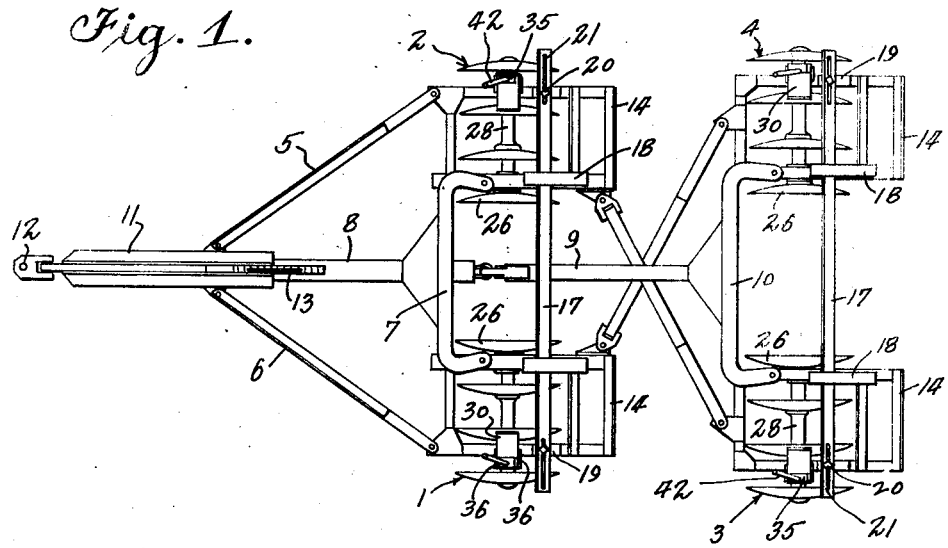
Figure 1 is a plan view of the disc ridger embodying our invention.

In the preferred embodiment of our invention as illustrated in the accompanying drawings, 1, 2, 3, and 4 indicate four gangs of disks connected together in double tandem relation wherein there are front gangs of disks 1 and 2 and rear gangs of disks 3 and 4. A hitch structure is connected to the forward gang of disks 1 and 2, including hitch bars 5 and 6 connected to the outer corners of the frames of the front gangs of disks 1 and 2, respectively. The inner corners of the front gang of disks 1 and 2 are connected together by means of a yoke 7 which is connected to the draft bar 8. A connecting bar 9 extends from the yoke 7 and is connected at its rear end to a corresponding yoke 10, which yoke 10 is connected between the inner ends of the gangs of disks 3 and 4, respectively.

Figure 2:
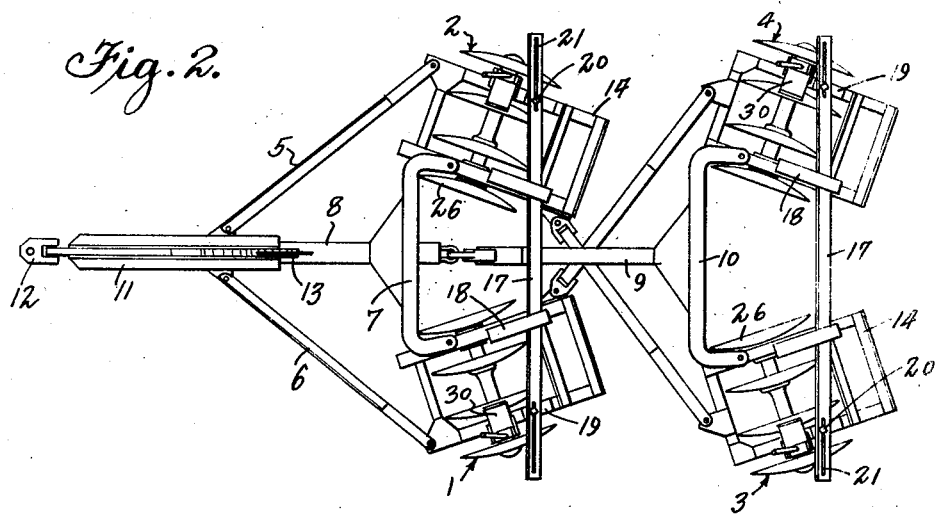
Figure 2 is a similar plan view illustrating the disk gangs moved to the angled or ridging position.

The hitch bars 5 and 6 are pivotally connected to a slide 11 which is slidably mounted upon the hitch bar 8. The slide 11 is provided at its forward end with means 12 for connecting the same with a tractor or other power device. A latch mechanism 13 is interposed between the slide 11 and hitch bar 8 in order to permit relative movement of the slide 11 and hitch bar 8 to latch the said parts together when such movement is not desired. By this structure, as is common in disk harrows, the gangs of disks are angled in a horizontal plane from their transporting position, as illustrated in Figure 1, to their working position, as illustrated in Figure 2.

The gangs of disks 1, 2, 3, and 4 are each of similar construction and each includes a frame 14 in which the disks upon their respective shafts are journaled on bearings 15 and 16. The bearings may be of any suitable or desirable construction such, for example, as is well understood in the art.

In order to hold the respective frames 14 in substantially the same plane, holding bars 17 are provided, which holding bars are mounted in guide frames 18 carried by each of the frames 14. The holding bars 17 are secured to the frame blocks 19 by means of bolts 20 which are secured to the blocks 19 and passed through elongated slots 21 formed in the holding bars 17.

In order to permit the gangs of disks to be tilted for the formation of, or breaking down of, beds, the inner bearings 15 of each gang of disks is connected through a bearing bracket 22 to a hinge plate 23, which hinge plate 23 is pivotally connected at a pivot 24 to a complementary hinge plate 25 carried by the frame 14.

The concavo convex disks 26 of each gang of disks are mounted upon a gang rod 27 and are held in spaced relation by means of spacing spools 28 mounted upon the gang rods 27 between the disks and bearings 15 and 16, respectively. The disks of each gang are turned with their concave sides, or faces, toward the center end of each of said gangs.

At their opposite ends the bearings 16 are connected by means of a bracket 29 to arcuate slide bars 30, the radii of which arcs corresponds with the distance in a horizontal plane of the center of such arc bar from the center of the pivot pin 24.

A bracket 31, formed arcuate and of substantially the same radius of curvature as the slide bar 30, is provided on each frame 14, and the bracket 31 consists of two arcuate end plates 32 between which the arcuate slide bar 30 is mounted. The plates 32 are secured in position upon the frame 14 by means of a securing bracket 33 which is bolted to frame 14 and end plates 32, respectively.

A jack means consisting of a jack screw 34 is provided for tilting the gangs on their pivots 24, causing the slide bars 30 to move through the slide bracket 31. The jack screw is threaded through a trunnioned nut 35. The trunnion nut 35 is held in position between supporting plates 36 upon its trunnions 37. The plates 36 are secured to the arcuate plates 32 of the bracket 31. The jack screw 34 is secured at its lower end to a trunnion 38, which trunnion 38 is pivoted between a pair of ears 39 secured to the slide bar 30. The lower end of the jack screw 34 is secured in position with relation to the trunnion 38 by means of securing nuts 40 and 41 threaded to the jack screw above and below the trunnion 38. It will be obvious that by rotation of the jack screw 34 through the medium of its crank handle 42, that the threading of the screw through the threaded trunnion 35 results in movement of the slide 30 through the slide bracket 31, thereby raising or lowering the outer end of the gang of disks, depending upon the direction of rotation of the screw 34. In this manner the power means as provided for raising and lowering the outer ends of each gang of disks is operative without disconnecting the gangs of disks from the frame or without raising the frames from their position which they assume while the disk blades 26 are in engagement with the soil.

Having fully described our invention, it is to be understood that we do not wish to be limited to the details herein set forth, but our invention is of the full scope of the appended claims.

We claim:

1. In a disk bedder, a gang of disks including a frame, a disk gang rod, a plurality of concavo-convex disks mounted in spaced relation along the gang rod, spaced bearings for rotatably supporting the disk blades with relation to the frame, a horizontal hinge means for connecting the frame with the disk assembly at one side of the frame, an arcuate slide bar carried by the disk assembly at the other side of the frame, an arcuate slide mounted upon the frame to guide the slide bar, the radius of curvature of the slide bar and the slide being substantially equal to the horizontal distance from the axis of the horizontal hinge to the center of the slide bar, a screw means carried by the slide, and a nut carried by the slide bar whereby adjustment of the screw means through said nut will determine the position of the disk blades with reference to said frame.

2. In a disk bedder, a gang of disks, a frame, a disk gang rod, a plurality of concavo-convex disk blades mounted in spaced relation along the gang rod, spaced bearings for rotatably supporting the disk blades, horizontal hinge means for connecting the frame with the disk assembly at one side of the frame, a guide slide means connecting the disk assembly with the frame at the other side of the frame, and a screw jack means connected between the slide and frame whereby the screw means may be actuated to adjust the position of angularity of the disks with respect to the frame.

3. In a disk bedder, a pair of forward gangs of disks and a pair of rearward gangs of disks, means for connecting said gangs of disks together whereby the same may be angled in a horizontal plane, each of said gangs of disks including a frame, a hold-down bar connecting the front gang of disks and a similar hold-down bar connecting the rear gang of disks whereby the frames of said gangs of disks may be maintained in horizontal position, each of said gangs of disks including a gang rod upon which a plurality of concavo-convex disks are mounted, means pivotally connecting the concavo-convex discs with the frames, and screw jack means connecting said frames with said disks whereby the disks may be angled in a vertical plane.

4. In a disk bedder, a gang of disks including a frame, a disk gang rod, a plurality of concavo-convex disc blades mounted in spaced relation along the gang rod, spaced bearings for rotatably supporting the disk blades with relation to the frame, means pivotally connecting the disk assembly with the frame at one side of the frame, slide means interposed between the frame and the disk rod at the other side of the frame, and jack means interposed between the frame and the slide whereby the disk rod may be angled in a vertical plane with respect to said frame.

5. In a disk bedder, a gang of disks including a frame, a disk gang rod, a plurality of concavo-convex disk blades mounted in spaced relation along the gang rod, spaced bearings for rotatably supporting the disk blades in relation to the frame, horizontal hinge means for connecting the frame with one of said bearings, an arcuate slide bar connected with the other of said bearings, and a screw means operatively connected between the slide bar and the frame for raising or lowering the latter said bearing with reference to the frame.

OSCAR W. SJOGREN.
GEORGE E. GEROLD.